May 1, 1951  R. G. ANDERSON  2,551,230
FLEXIBLE DRIVE
Filed June 4, 1947  2 Sheets-Sheet 1

Inventor:
Robert G. Anderson,
by Prowell S. Mack
His Attorney.

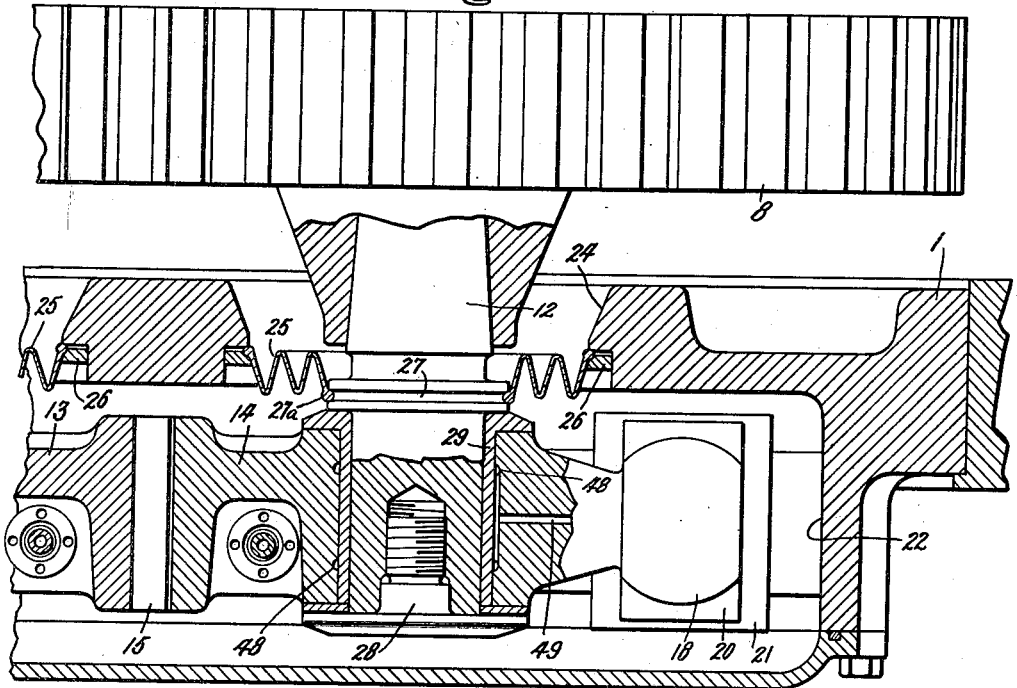

Patented May 1, 1951

2,551,230

UNITED STATES PATENT OFFICE 2,551,230

FLEXIBLE DRIVE

Robert G. Anderson, Erie, Pa., assignor to General Electric Company, a corporation of New York Application June 4, 1947, Serial No. 752,506

10 Claims. (Cl. 105—132)

My invention relates to a flexible drive, and more particularly to improved flexible transmission for electric motor driven railway vehicles.

In order to allow for the relative vertical, lateral and tilting movement of the railway truck and body with respect to the axle and drive wheels, which is caused by curvature of the track as well as irregularities therein, a number of flexible power transmission or drive arrangements have been applied which more or less satisfactorily accomplish this main purpose. One of the chief difficulties in flexible drives of the so-called "link" type has been the maintenance of adequate lubrication at all bearings and moving parts, as well as the inability to maintain such moving parts as spherical bearings, gear sectors and sliding members suitably enclosed whereby they will be protected from dirt and abrasive material drawn up from the roadbed.

It is, therefore, an object of my invention to provide an improved flexible drive for railway vehicles.

It is another object of my invention to provide an improved lubrication system for maintaining all moving and wearing parts of a railway flexible drive adequately supplied with lubricant.

It is a further object of my invention to provide an improved seal for totally enclosing all moving and wearing parts of a flexible link drive so that such parts will be adequately protected from dirt and abrasive materials.

My invention will be more fully set forth in the following description taken in connection with the accompanying drawings, and the features of novelty therein will be pointed out with particularity in the claims annexed to and forming part of this application.

Figure 1:
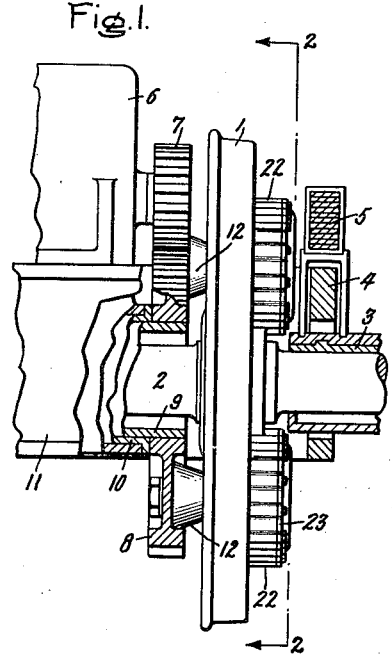
Figure 2:
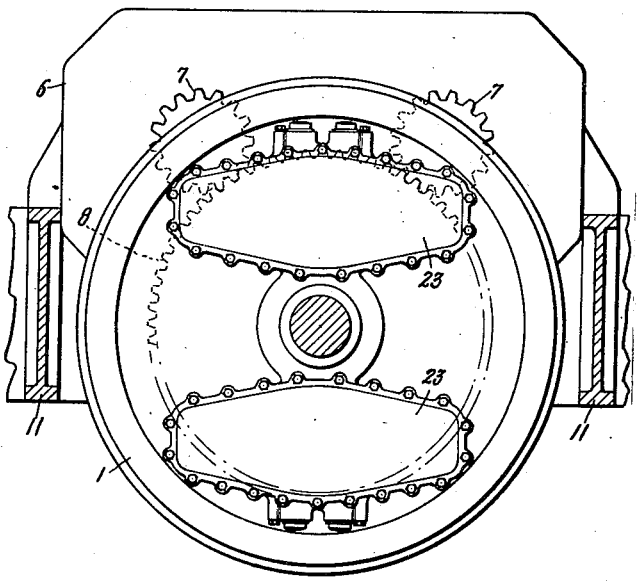
Figure 3:
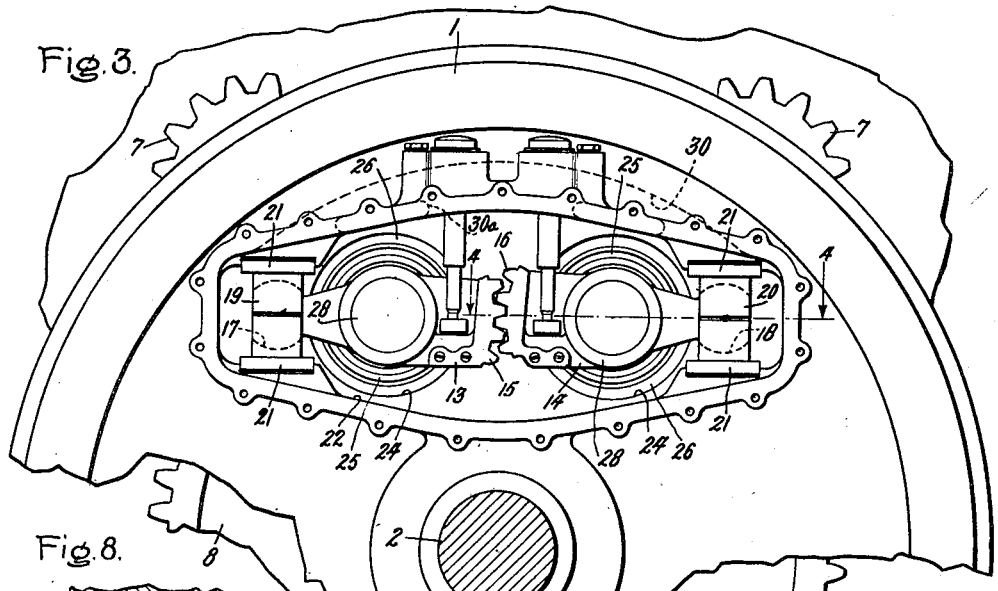
Figure 8:
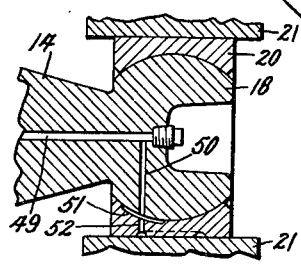

In the drawings, Fig. 1 is a partial section of a power truck for an electric drive vehicle; Fig. 2 is a view of the portion of the power truck taken along the line 2—2 of Fig. 1; Fig. 3 is a fragmentary section showing the link drive assembly; Fig. 4 is a cross sectional view of the gear case of Fig. 3 and taken along the line 4—4 of Fig. 3; Fig. 5 is a cross sectional view showing the details of the oil pumping apparatus; Figs. 6 and 7 are cross sectional views of a portion of the oil supply and distribution system taken along the lines 6—6 and 7—7, respectively, of Fig. 5, and Fig. 8 is a cross sectional view of the crosshead connecting the link to the drive wheel as shown generally in Fig. 3.

Referring now to the drawings, the locomotive or railway vehicle power truck with which I have illustrated my invention comprises a driving wheel 1 mounted on an axle 2 which is carried in a journal bearing 3 and, in turn, supports the truck frame 4 by means of the springs 5. The vehicle is arranged to be driven by one or more electric motors 6 as shown in Fig. 1 and which are provided with pinion gears 7 engaging the main driving gear 8. The driving gear is mounted on a quill shaft 9 which surrounds the axle 2 and is supported in bearings 10 which are formed integral with the main frame of the motor 6. The driving motor 6, as shown in Fig. 2, comprises a double armature construction or actually two motors in one frame supported on the transverse truck frame members 11, thereby forming a unitary structure with the driving gear, quill shaft and truck frame.

Motive power is transmitted to the drive wheel 1 by means of the drive pins 12 which are secured to the driving gear 8 and arranged in pairs equally and oppositely spaced from the center of the driving gear 8. Where it is desirable to maintain minimum wheel diameter, only one pair of driving pins need be used. As shown in Fig. 3 the driving pins 12 extend into a recess provided therefor in the drive wheel center, and secured to the end of these pins, on bearings for pivotal movement, are the levers 13 and 14 which are provided with the intermeshed toothed portions 15 and 16, respectively. The outer ends of the levers 13 and 14 transmit driving power from the pins 12 to the wheel 1 by means of the spherical joints 17 and 18 in the crosshead members 19 and 20, respectively, which, in turn, are arranged to maintain sliding contact between the inner surfaces of the bearing plates 21 which are rigidly secured to the driving wheel. The system as thus far described forms a flexible drive wherein the driving wheel 1 and the main gear 8 are free to move laterally as well as radially with respect to each other, and at the same time provide for transmission of torque between the driving gear and the wheel.

The entire assembly consisting of two driving pins, with connected levers 13 and 14, and crossheads, is contained within the casing 22 formed in the driving wheel center and which is provided with an oil-tight cover plate 23. As shown in cross section in Fig. 4, the main driving wheel is provided with an aperture 24 of sufficient clearance to allow for the maximum radial movement of the driving gear relative to the wheel so that at no time will the driving pins 12 strike the main part of the driving wheel. In order to insure the successful operation of the link drive mechanism, it is necessary to exclude all foreign material such as abrasive roadbed particles, and to retain a supply of lubricant in the casing 22. A convoluted annular seal 25 of suitable flexibility and made of oil resistant resilient material is provided and maintained in place by means of a clamping ring 26 for securing the outer circumference of the seal 25 to the main wheel structure. The seal is also provided with a bead portion 27a which is firmly engaged in the groove 27 formed in the driving pin 12. While I have shown only the details of one driving pin and the associated lubricant seal, it will be understood that a similar arrangement is provided on the other driving pins (details not shown). The resilient nature of the convoluted seal 25 offers no resistance to the movement of the driving pin relative to the wheel, and at the same time effectively seals the only opening in the casing 22 by which foreign material can enter the casing, and thereby cause, or contribute materially to, the rapid wear and increased maintenance of the moving parts, bearings and gear surfaces contained therein.

The seal 25 may be quickly replaced by removal of the cap screw 28 which secures the lever 14 to the bearing 29 on the end of the driving pin 12, after which the lever may be removed and the seal, after loosening of the clamping ring 26, can be pulled off over the end of the driving pin 12.

The enclosed casing 22 is arranged to be partially filled with lubricating oil so that with the locomotive stationary, and as viewed in Fig. 3, the oil level would be approximately on a line with the bottom edge of the gear sectors 15 and 16 and at the lower surface of the spherical joints 17 and 18. As the wheel revolves, oil will, of course, be splashed over the entire mechanism within the casing, thereby providing lubrication at low speeds, and at higher speeds will be thrown by centrifugal force to the outer periphery of the casing near the tire on the driving wheel. In order to make certain that lubrication to all parts is maintained at high speeds, I have provided a fully automatic oil pumping system which operates by virtue of the rocking movement of the levers 13 and 14 due to the normal unevenness and irregularities in the roadbed. In other words, during operation of the vehicle, the levers 13 and 14 will be constantly oscillating, at least to a slight extent, due to rail joints and other irregularities in the track.

As shown in Figs. 5, 6 and 7, the oil collecting chamber 30 is formed integrally with the main wheel center casting and extends from one end of the casing 22 to the other end in a semi-circular arc, as shown by the dotted lines in Figs. 3 and 5, and communicates with the interior of the casing 22 at a number of places, for example 30a in Fig. 6. Thus under rotation of the driving wheel at high speeds, the oil contained in the casing 22 is forced, by centrifugal action, to the outermost part of the casing 22, into the passage 30 where it flows by centrifugal pressure through the passage 31 to the inlet side of the pump intake valve 32, as shown in Fig. 7. Thus during operation there is always an available supply of oil at the inlet side of the valve 32 and which is prevented from reverse flow from the oil pump by means of the ball check valve 33 which is maintained in a closed position by the spring 34. The outlet side of this valve communicates with the main pump chamber 35 through the passage 36, thereby allowing the chamber 35 to become filled with oil at high speed operation due to the centrifugal force moving the oil from the reservoir 30, through the check valve 33 against the bias spring 34 and into the pump chamber 35.

Fig. 5 illustrates in detail the oil pump which consists of the cylinder seat 37 having an internal spherical surface designed to engage the spherical surface on the upper end of the telescopic two-part cylinder 38 to allow for universal movement of the cylinder relative to the cylinder seat. The cylinder 38 embodies an inner sleeve portion or piston 39 which is connected at its lower end by means of a ball joint 40 to the spherical joint 41 which is rigidly secured to the inner end of the oscillating lever 14. A central passage 42 extends through the telescopic cylinder, and is provided with a ball check valve 43 at its upper end and a second check valve 44 at the lower or outlet end. Thus from Fig. 5 it will be apparent that as the lever arm 14 oscillates there will be a reciprocating motion of the piston 39 within the cylinder 38, resulting in a pumping action which, due to the check valves 33, 43 and 44, will cause oil to flow only in the direction of the arrows shown in the central passage 42. After passing through the outlet check valve 44, the oil is then distributed from the outlet passage 45, through the passage 46 where lubrication of the gear sectors 15 and 16 is obtained, and also through the passage 47 for lubricating the main bearing by which the lever 14 is secured to the driving pin 12. As viewed in Figs. 4 and 5, oil grooves 48 are provided in the bearing surface of the lever 14, thus conducting oil to the outer surface of the bearing 29. The bearing 29 is preferably made of porous bearing metal so that oil supplied to its outer surface by the oil grooves 48 will penetrate and completely lubricate all parts of the bearing. In addition, an oil passage 49 extends from the ducts 48 to the spherical joint 18 in the crosshead 20 at the right end of the lever 14. This is best shown in Fig. 8 where it will be observed that oil flows through the passage 49, thence through the passage 50, and into the oil groove 51 surrounding ball joint 18. In addition, a passage 52 communicates with the sliding surface between the crosshead member 20 and the lower bearing plate 21, thereby lubricating the lower bearing plate. Forced lubrication of the upper bearing plate is not necessary since a portion of this plate will be immersed in the oil which is maintained by centrifugal force along the outer surface of the enclosing casing 22 during rotation of the drive wheel.

The system is also provided with a safety oil pressure release feature so that in the event of a severe and sudden jar to the driving wheel, the pressure built up in the oil system will not reach a value sufficiently high to damage any of the check valves or pumping apparatus. This consists in the arrangement by which the cylinder seat 37 is biased by the spring 53 to the upper position as shown in Fig. 5. It will be noted that when the cylinder seat 37 is in this position, the oil passage 54 is maintained closed, and the only oil outlet from the pump chamber 35 is through the check valve 43 and thence to the oil distribution system. However, in the event the oil pressure built up in the chamber 35 reaches dangerous proportions, by virtue of abnormal or sudden movement of the lever 14, this oil pressure will force the entire cylinder seat and cylinder assembly downwardly against the force exerted by the spring 53, thereby uncovering the port to the oil passage 54 and allowing high pressure oil to be returned to the open interior of the main enclosing casing 22.

The forced-feed oil lubrication system just described is complete and automatic in that during periods when most effective lubrication is required, such lubrication is insured by the oscillating action of the levers 13 and 14, with a resultant pumping of oil through the distribution passages to all bearings and wearing surfaces. The foregoing description of the lubrication system has been confined to a detailed disclosure of one complete system as associated with the oscillating lever 14. However, from Fig. 3 it will be apparent that the system is duplicated with respect to the left-hand lever 13, each oil pressure system being completely independent of the other. In a similar manner, if two pairs of driving pins 12 and levers 13 and 14 are employed, as shown in Figs. 1 and 2, the construction of each of the individual driving pins and levers with its associated flexible driving pin seal and forced-feed lubrication pumping system will be identical to that described in connection with the lever 14.

The complete system, therefore, permits the application of a link-type of flexible drive wherein all working and moving parts are completely enclosed and protected from entrance of damaging foreign material, and the leakage of lubricant to the outside is also prevented and, in addition, the hereinbefore described forced lubrication system insures that all bearing surfaces and moving parts will receive an adequate supply of lubrication at high speeds and also at low speeds, since these parts will receive a continuous bath of oil by the splashing of the lubricant within the casing during rotation of the wheel at low speeds.

While I have shown and described a particular embodiment of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A flexible coupling including two rotatable members, two levers each pivoted centrally to one of said rotatable members, said levers being meshed together at their adjacent ends for oscillatory motion, the other ends of said levers having spherical joints formed thereon cooperating with crosshead members, said crosshead members slidingly engaging bearing portions on the other of said rotatable members for connecting said levers to the other rotatable member for universal movement relative thereto, and lubricant circulating means mounted on said last mentioned rotatable member and arranged for actuation by oscillatory motion of said levers.

2. A flexible coupling including two rotatable members, two levers each pivoted centrally to one of said rotatable members, said levers being intermeshed at their adjacent ends for oscillatory motion, the opposite ends of said levers having spherical joints formed thereon cooperating with crosshead members, said crosshead members slidingly engaging bearing portions on the other of said rotatable members for connecting said levers to the other rotatable member for universal movement relative thereto, lubricant pumping means mounted on said last mentioned rotatable member and arranged for actuation by oscillatory motion of said levers, and lubricant conducting passages in said levers for conveying lubricant from said pumping means to the intermeshed ends of said levers and to said spherical joints on said levers.

3. A flexible coupling including two rotatable members, a partially enclosed casing disposed on one of said rotatable members, a pair of pins mounted on the other of said rotatable members and extending into said casing, a pair of levers respectively pivoted centrally to said pins and disposed within said casing, said levers being meshed together at their adjacent ends for oscillatory motion, the other ends of said levers having spherical joints formed thereon cooperating with crosshead members, said crosshead members slidingly engaging bearing portions on the other of said rotatable members for connecting said levers to the other of said rotatable members for universal movement relative thereto whereby limited axial and radial movement of said one rotatable member relative to said pins is provided, means for completely enclosing said casing thereby forming a lubricant reservoir, and a lubricant pump disposed within said casing, said pump having its inlet disposed near the outer periphery of said casing whereby lubricant is supplied to said inlet by centrifugal force during rotation of said one rotatable member, and means linking said pump to said levers for actuating said pump responsive to oscillatory motion of said levers.

4. A flexible coupling including two rotatable members, a partially enclosed casing disposed on one of said rotatable members, a pair of pins mounted on the other of said rotatable members and extending into said casing, a pair of levers respectively pivoted centrally to said pins and disposed within said casing, said levers being meshed together at their adjacent ends for oscillatory motion, the other ends of said levers having spherical joints formed thereon cooperating with crosshead members, said crosshead members slidingly engaging bearing portions on the other of said rotatable members for connecting said levers to the other of said rotatable members for universal movement relative thereto, whereby limited axial and radial movement of said one rotatable member relative to said pins is provided, means for completely enclosing said casing thereby forming a lubricant reservoir, a lubricant pump having an inlet and an outlet disposed within said casing and arranged to be actuated by pivotal motion of said levers, said pump having its inlet disposed adjacent the outer periphery of said casing whereby lubricant is supplied to said inlet by centrifugal force during rotation of said one member, and lubricant passages communicating with said pump outlet for conducting lubricant to said pins and said spherical points.

5. A flexible coupling including two rotatable members, a casing disposed on one of said rotatable members, a pair of pins mounted on the other of said rotatable members and extending into said casing, a pair of coupled levers connecting said pins to said drive wheel disposed within said casing and providing for limited axial and radial movement of said drive wheel relative to said pins, flexible seals extending between said pins and said casing to completely enclose said casing thereby forming a lubricant reservoir, said one rotatable member having a lubricant collecting chamber formed therein communicating with said casing for collecting lubricant thrown centrifugally from said casing during rotation of said one rotatable member, and a lubricant pump for furnishing lubricant to said levers disposed within said casing and having its inlet communicating with said chamber whereby lubricant from said chamber is supplied to said pump, said pump being arranged for actuation by movement of said levers.

6. A flexible coupling including two rotatable members, a casing disposed on one of said rotatable members, a pair of pins mounted on the other of said rotatable members and extending into said casing, a pair of coupled levers connecting said pins to said one rotatable member disposed within said casing and providing for limited axial and radial movement of said one rotatable member relative to said pins, flexible seals extending between said pins and said casing to completely enclose said casing thereby forming a lubricant reservoir, said one rotatable member having a lubricant collecting chamber formed therein beyond the outer periphery of said casing and communicating with said casing for collecting lubricant thrown centrifugally from said casing during rotation of said one rotatable member, a lubricant pump having an outlet and inlet disposed within said casing and arranged to be actuated by motion of said levers, said pump having its inlet communicating with said chamber whereby lubricant from said chamber is supplied to said pump, a check valve arranged in said pump inlet for preventing reverse flow of lubricant from said pump, and lubricant passages communicating with said pump outlet for conducting lubricant to said pins and levers.

7. A flexible coupling including two rotatable members, a casing disposed on one of said rotatable members, a pair of pins mounted on the other of said rotatable members and extending into said casing, a pair of coupled levers connecting said pins to said one rotatable member disposed within said casing and providing for limited axial and radial movement of said one rotatable member relative to said pins, flexible seals extending between said pins and said casing to completely enclose said casing thereby forming a lubricant reservoir, said one rotatable member having a lubricant collecting chamber formed therein beyond the outer periphery of said casing and communicating with said casing for collecting lubricant thrown centrifugally from said casing during rotation of said one rotatable member, a lubricant pump having an inlet and outlet disposed within said casing and arranged to be actuated by a motion of said levers, said pump having its inlet communicating with said chamber whereby lubricant from said chamber is supplied to said pump, lubricant passages communicating with said pump outlet for conducting lubricant to said pins and levers, and a spring biased valve associated with said pump for diverting lubricant to said casing to relieve excessive lubricant pressure in said passages.

8. A flexible coupling including two rotatable members, a casing disposed on one of said rotatable members, a pair of pins mounted on the other of said rotatable members and extending into said casing, a pair of coupled levers connecting said pins to said one rotatable member disposed within said casing and providing for limited axial and radial movement of said one rotatable member relative to said pins, flexible seals extending between said pins and said casing to completely enclose said casing thereby forming a lubricant reservoir, said one rotatable member having a lubricant collecting chamber formed therein beyond the outer periphery of said casing and communicating with said casing for collecting lubricant thrown centrifugally from said casing during rotation of said one rotatable member, a lubricant pump disposed within said casing, said pump comprising a pump chamber, a passage communicating with said collecting chamber and said pump chamber whereby lubricant from said collecting chamber is supplied to said pump, a cylinder member seated in said pump chamber and adapted for universal movement with respect thereto, a piston member arranged in said cylinder member and having one end connected to one of said levers by a universal connection whereby said pump is actuated by movement of said levers, said cylinder and said piston members having a central passage formed therein communicating with said pump chamber forming the outlet for said pump, and passages formed in said one lever communicating with said central passage for furnishing lubricant to said pins and levers.

9. A flexible coupling including two rotatable members, a partially enclosed casing disposed on one of said rotatable members, a pair of pins mounted on the other of said rotatable members and extending into said casing, a pair of levers respectively pivoted centrally to said pins and disposed within said casing, said levers being meshed together at their adjacent ends for oscillatory motion, the other ends of said levers having spherical joints formed thereon cooperating with crosshead members, said crosshead members slidingly engaging bearing portions on the other of said rotatable members for connecting said levers to the other rotatable member for universal movement relative thereto whereby limited axial and radial movement of said one rotatable member relative to said pins is provided, means for completely enclosing said casing thereby forming a lubricant reservoir, said one member having a lubricant collecting chamber formed therein beyond the outer periphery of said casing and communicating with said casing for collecting lubricant thrown centrifugally from said casing during rotation of said one member, a lubricant pump disposed within said casing, said pump comprising a pump chamber, a passage communicating with said collecting chamber and said pump chamber whereby lubricant from said collecting chamber is supplied to said pump, a cylinder member seated in said pump chamber and adapted for universal movement with respect thereto, a piston member arranged in said cylinder member and having one end connected to one of said levers by a universal connection whereby said pump is actuated by movement of said levers, said cylinder and said piston members having a central passage formed therein communicating with said pump chamber for forming the outlet for said pump, and passages formed in said one lever communicating with said central passage for furnishing lubricant to said pins and levers.

10. A flexible coupling including two rotatable members, a casing disposed on one of said rotatable members, a pair of pins mounted on the other of said rotatable members and extending into said casing, a pair of coupled levers connecting said pins to said one rotatable member disposed within said casing and providing for limited axial and radial movement of said one rotatable member relative to said pins, means for completely enclosing said casing thereby forming a lubricant reservoir, a lubricant pump having an inlet and an outlet disposed within said casing, said pump having its inlet disposed adjacent the outer periphery of said casing whereby lubricant is supplied to said inlet by centrifugal force during rotation of said one rotatable member, said pump comprising a pump chamber, a cylinder member seated in said pump chamber and adapted for universal movement with respect thereto, a piston member arranged in said cylinder member and having one end connected to one of said levers by a universal connection whereby said pump is actuated by movement of said levers, said cylinder and said piston members having a central passage formed therein communicating with said pump chamber for forming the outlet for said pump, and lubricant passages communicating with said pump outlet for conducting lubricant to said pins and levers.

ROBERT G. ANDERSON.

REFERENCES CITED

The following references are of record in the file of this patent:

UNITED STATES PATENTS

| Number | Name | Date |
|---|---|---|
| 1,298,881 | Buchli | Apr. 1, 1919 |
| 1,729,899 | Rusby | Oct. 1, 1929 |
| 1,902,800 | Gordon | Mar. 21, 1933 |

FOREIGN PATENTS

| Number | Country | Date |
|---|---|---|
| 267,393 | Great Britain | Mar. 17, 1927 |